Oct. 28, 1958  W. PECHY  2,857,939
CAN FILLING MACHINE WITH SCRAPER DEVICE
Filed Feb. 12, 1954  4 Sheets-Sheet 4

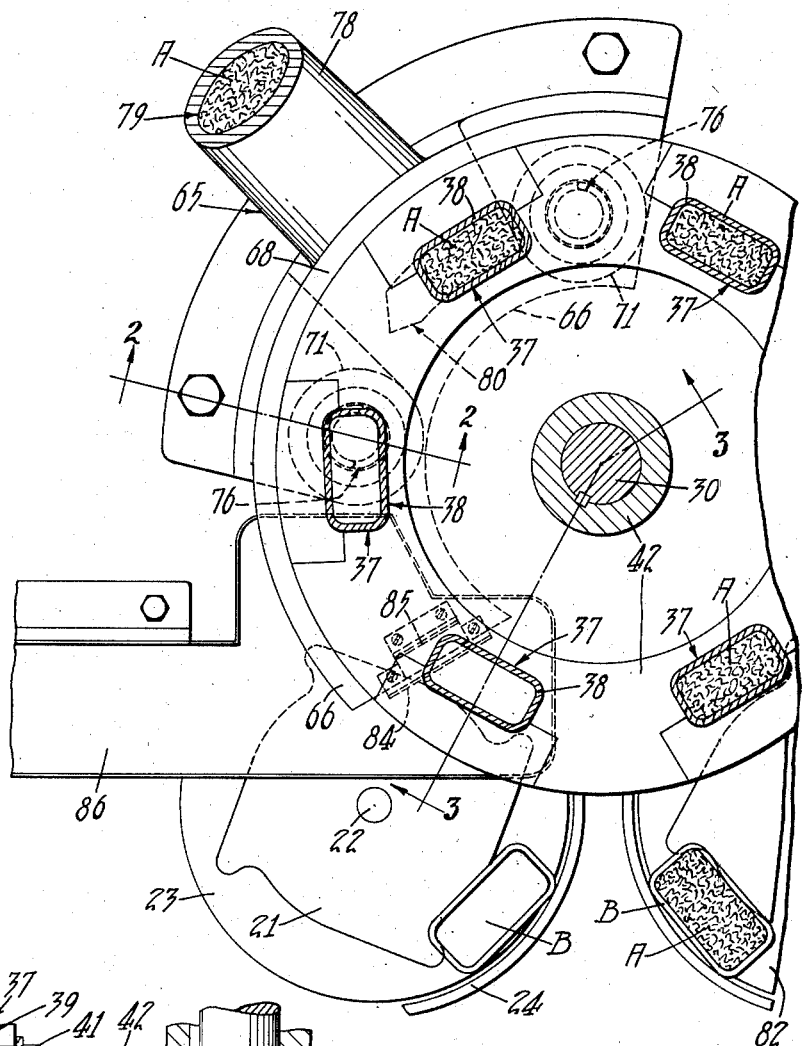

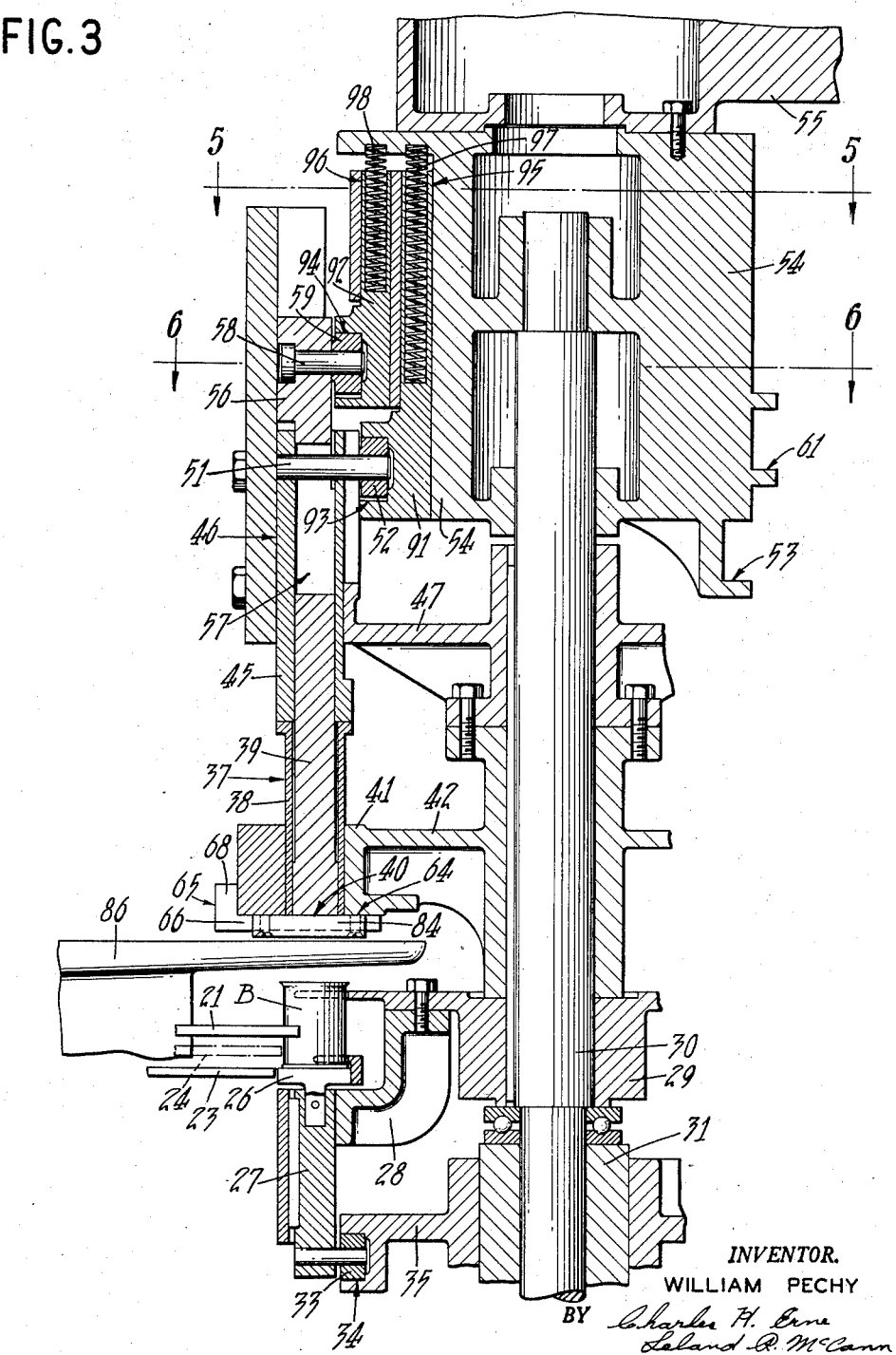

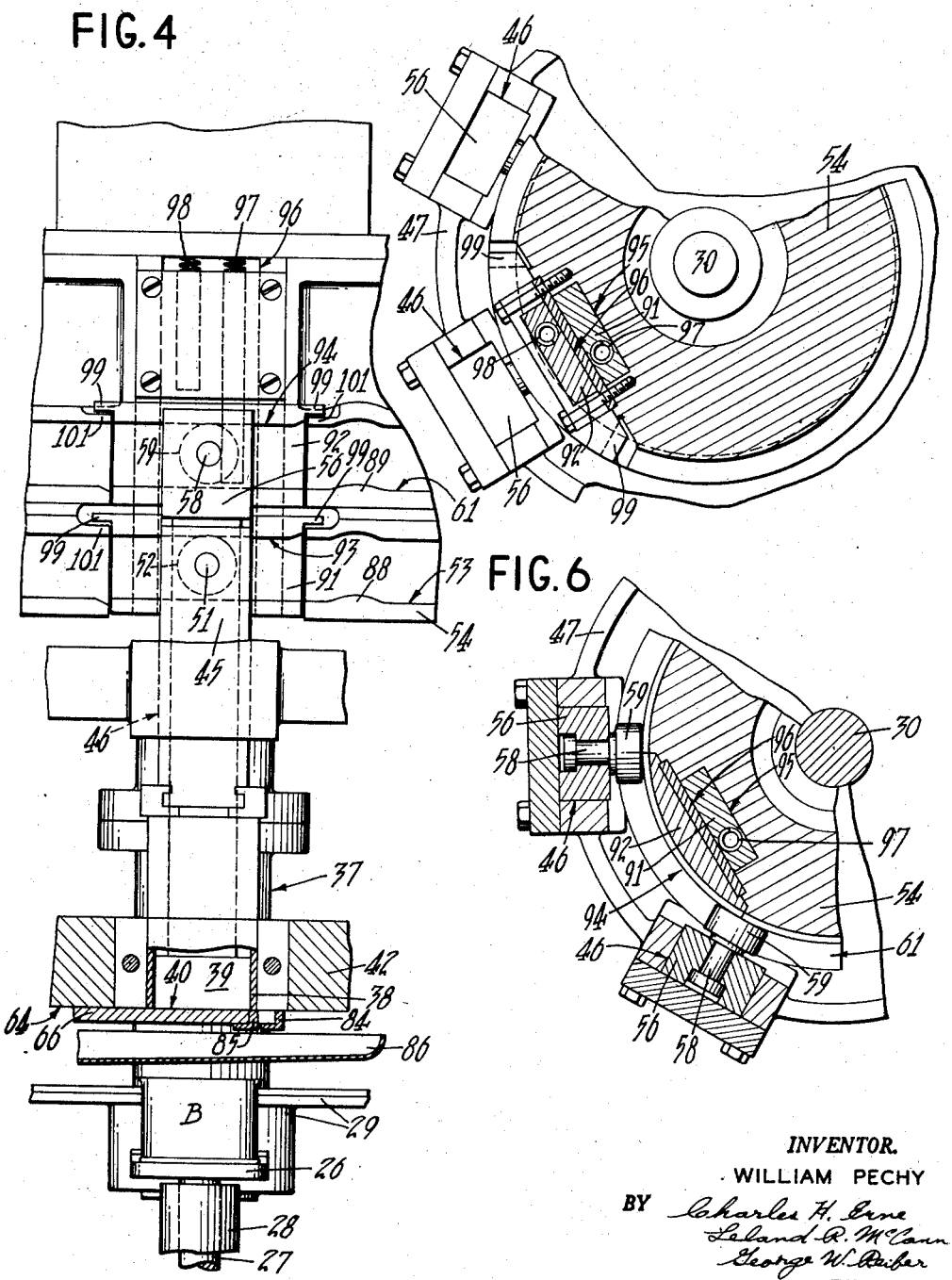

INVENTOR.
WILLIAM PECHY
BY *Charles H. Cane*
*Leland R. McCann*
*George W. Reiber*
ATTORNEYS United States Patent Office 2,857,939
Patented Oct. 28, 1958

2,857,939

CAN FILLING MACHINE WITH SCRAPER DEVICE

William Pechy, Belmar, N. J., assignor to American Can Company, New York, N. Y., a corporation of New Jersey Application February 12, 1954, Serial No. 409,961

6 Claims. (Cl. 141—250)

The present invention relates to filling machines for packing meat products and the like into cans or containers and has particular reference to an improved scraper device for cleaning the discharge face of carrier elements used to receive measured charges of the product and to introduce the charges into the cans or containers.

In machines for packing meat products into cans or containers, the product especially when finely divided is introduced into a mold or carrier element and the element inserted into a container and gradually withdrawn as the product is forced out of the element and into the container. This leaves the product in the can in a compact mass that fills the can without appreciable entrapment of air. The carrier elements usually are parts of filling heads which are movable into position to pick up a supply of the product and to subsequently follow the path of travel of a can to transfer the product thereinto.

At the completion of a can filling operation, residual meat products often cling to the discharge end of the carrier elements. For sanitary purposes and to avoid excessive accumulation it is desirable to clean this residual product from the carrier elements following each filling operation. There are many ways in which this cleaning operation may be accomplished. Experience has taught that the most effective way is by use of a scraper. However it is difficult to use a scraper, since advancement of the carrier elements to follow the path of the traveling cans usually brings about lateral interference or collision between the carrier element and the scraper with the result that damage may be done to these parts, causing excessive shutdowns in the operation of the machine.

An object of the instant invention is the provision in such a filling machine of an improved scraper device which overcomes these difficulties and wherein relative movement is effected between a carrier element and the scraper in a direction toward each other after they are shifted into opposed, spaced apart, aligned positions so that initial engagement is made within the defining boundaries of the carrier element face and between the scraping edge of the scraper and the face of the carrier element to be cleaned to insure against interference between the scraper and the side of the carrier element.

Another object is the provision of such an improved scraper device wherein a plurality of scrapers arranged in spaced relation are utilized to provide for a primary scraper to insure proper initial contact with the face to be cleaned and at least one auxiliary trailing scraper to subsequently ride onto the face while the latter is held in proper position by the primary scraper and to scrape across the entire face to insure cleaning of those portions of the face not engaged by the primary scraper.

Another object is the provision of such a scraper device wherein contact between the scrapers and the carrier element face is of a yieldable nature so as to provide for pressurized engagement between these parts with a resulting scraping action that thoroughly cleans the face of all residual products.

Numerous other objects and advantages of the invention will be apparent as it is better understood from the following description, which, taken in connection with the accompanying drawings, discloses a preferred embodiment thereof.

Referring to the drawings:

Figure 1 is a top plan sectional view of a can filling machine embodying the instant invention, with parts broken away;

Figs. 2 and 3 are sectional views taken substantially along the lines 2—2, 3—3 respectively in Fig. 1, with parts broken away;

Fig. 4 is a front elevation as viewed from the left in Fig. 3, parts being broken away and parts being shown in section;

Figure 7:
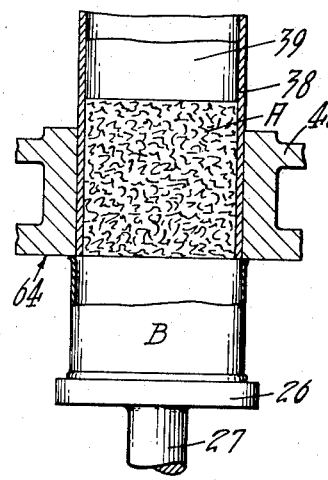

Figs. 5 and 6 are fragmentary sectional views as taken substantially along the respective lines 5—5 and 6—6 in Fig. 3; and Figs. 7 to 11 inclusive are enlarged sectional schematic views of the can filling parts of the machine illustrating the parts in different positions incidental to filling the product into a can.

As a preferred or exemplary embodiment of the instant invention the drawings illustrate principal parts of a can filling machine of the character disclosed in United States Patent 2,336,415 issued December 7, 1943, to R. E. J. Nordquist, et al. on Can Filling Machine.

In such a machine, a meat product A (Fig. 1) is filled into open top cans B moving through the machine in spaced and timed order. The empty cans B are received from any suitable source of supply and are advanced into the machine by a star wheel 21 (Fig. 1) mounted on and rotated by a shaft 22 as disclosed in the above mentioned Nordquist patent. The cans are supported in an upright position on a disc-shaped table 23 having a partially surrounding guide rail 24 to guide the cans into the machine.

The star wheel 21 positions the cans B individually onto lifter pads 26 (Figs. 2 and 3) having depending stems 27 carried in bearing brackets 28 secured to a can holding turret 29 keyed to a vertical rotatable shaft 30 journaled in a bearing 31 in the main frame of the machine. The shaft 30 is rotated in any suitable manner as disclosed in the above mentioned Nordquist patent. There are a plurality of the lifter pads 26 corresponding with the number of filling heads in the machine and they are carried around a circular path of travel by the rotation of the shaft 30, to advance the cans through the machine for the filling operation.

At their lower ends, each lifter stem 27 carries a cam roller 33 (Fig. 3) which operates in and traverses a cam groove 34 in a stationary barrel cam 35 secured to and surrounding the bearing 31 of the vertical shaft 30. As the shaft 30 rotates, the cam rollers 33 traverse the cam groove 34 and effect lifting and lowering of the cans B for the filling operation.

The filling of the cans B is effected by filling heads having product carrying elements 37 (Fig. 3). There is one carrying element 37 for each lifter pad 26 and each element is located above and in axial vertical alignment with its pad. Each carrying element 37 comprises a tubular measuring sleeve 38 which is shaped to fit within a can B and which surrounds a close fitting plunger or piston 39 adapted to slide easily within the sleeve. The plunger is provided with a flat bottom or discharge end face 40. The bottom or discharge end of the sleeve 38 is open so that the plunger 39 can project beyond the sleeve when required and the terminal end of the sleeve is flat to correspond with the flat face 40 of the plunger.

The lower ends of the sleeves 38 are slidably carried in bearings 41 formed in a disc-shaped turret 42 keyed to and surrounding the vertical shaft 30. The upper ends of the sleeves 38 are connected to vertical slides 45 (Fig. 3) which operate in the lower ends of vertical slideways 46 formed in a slide turret 47 keyed to and surrounding the shaft 30. The slide turret 47 is also secured to the turret 42 as shown in Fig. 3 to insure rotation of the two turrets in unison. The sleeve slides 45 carry pins 51 which project inwardly beyond the slides and in turn carry cam rollers 52 which operate in and traverse a cam groove 53 (see Figs. 3 and 4) in a stationary barrel cam 54 which is secured to a bracket member 55 of the main frame of the machine as shown in the Nordquist patent. The cam 54 surrounds the vertical shaft 30 and provides a bearing for the upper end of the shaft. The cam groove 53 raises and lowers the sleeves 38 in synchronism with other moving parts as will be hereinafter more fully explained.

In a similar manner, the plungers 39 are formed on plunger slides 56 (Figs. 3, 4, 5 and 6) which operate in the upper portion of the slideways 46. For this purpose the upper ends of the plungers extend up through the sleeves 38 and the sleeve slides 45 and are provided with clearance slots 57 for the sleeve slide roller pins 51. Like the sleeve slides 45, the plunger slides 56 carry pins 58 which extend inwardly beyond the slides and in turn carry cam rollers 59 which operate in and traverse a cam groove 61 (Fig. 4) in the stationary cam 54. This cam groove 61 raises and lowers the plungers 39 in the sleeves 38.

At the beginning of a cycle of operation the flat terminal end face of the sleeve 38 of a carrier unit 37 is flush with a smooth bottom face 64 of the turret 42 as shown in Fig. 2 and the plunger 39 is raised as shown in Fig. 2 to provide a measuring chamber within the sleeve to receive a charge of the meat product to fill into an aligned but spaced below can B on its lifter pad 26. With the sleeve 38 and plunger 39 in this position the rotating shaft 30 carries them across a manifold 65 (Figs. 1 and 2) to receive the product charge.

The manifold 65 is formed as a substantially flat plate 66 (Figs. 1, 2, 3 and 4) of arcuate shape to conform to the peripheral curvature of the bottom face 64 of the turret 42 and is provided with a smooth top face which frictionally and abuttingly engages against the turret face 64. An upright guide ledge 68 on the plate 66 partially surrounds the periphery of the turret 42 and locates the plate radially relative to the turret. The plate 66 is also held against lateral movement by a plurality of integral collars 71 which depend from the lower face of the plate and which surround upright bosses 72 formed on a bracket 73 secured to a member 74 of the machine frame. The bosses 72 are formed with sockets 75 which house compression springs 76 which yieldably press the manifold plate 66 upwardly against the turret face 64.

The manifold plate 66 is formed with an outwardly projecting hollow neck 78 which connects with a source of the meat product under pressure as shown in the above mentioned Nordquist patent. The neck 78 is formed with a conduit 79 which communicates with an opening or port 80 (Fig. 1) in the plate 66. This opening 80 registers with the open bottom end of each sleeve 38 as the sleeves slide across the manifold plate 66 with the rotation of the turret 42 and thus introduces the meat product A under pressure successively into the moving sleeves for subsequent transfer into the cans B.

Figure 8:
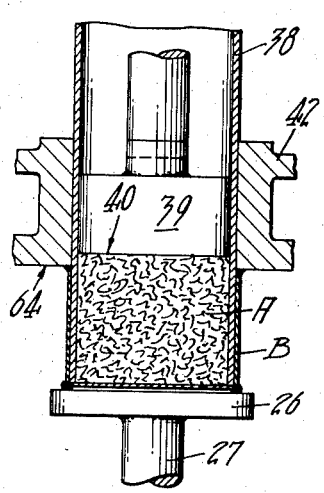
Figure 9:
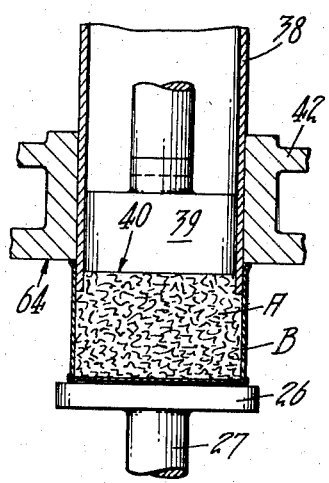

Upon receiving its charge of the meat product, a sleeve 38 rides off the manifold plate 66 and the aligned can B under the sleeve is lifted up into engagement with the bottom face 64 of the turret 42 as shown in Fig. 7. With the can in this position, the cam grooves 53, 61 of the cam 54 move the sleeve 38 down into and the plunger 39 towards the can as shown in Fig. 8. While the plunger 39 is held stationary, the sleeve 38 is withdrawn as shown in Fig. 9 and thus the product charge is transferred to the can. When the rising sleeve 38 is free of the can, the plunger 39 is lifted away from the product charge to permit the filled can to be lowered to its original position for discharge from the machine. A discharge star wheel 82 (Fig. 1) similar to the feed-in star wheel 21 is provided to sweep the filled can from is lifter pad 26 and propel it to any suitable place of discharge.

Provision is made for cleaning the flat bottom face 40 of the plunger 39 and the corresponding annular flat face of the sleeve 38, of any residual meat product that should cling to these faces after a can filling operation. This cleaning of the sleeve and plunger faces is performed just beyond the can discharge station and at a station adjacent the empty can entrance station (Fig. 1) where the entering cans are vertically spaced below the faces so that the cans will not interfere with the cleaning operation. This cleaning operation is effected by a pair of spaced and parallel stationary scraper blades 84, 85 (Figs. 1, 3, 4, 10 and 11) which are located under the rotating turret 42 and extend across the path of travel of the sleeve and the plunger. These scraper blades 84, 85 are mounted on the manifold plate 66 adjacent the approach end of the plate, with the top or scraping edges of the blades in contact with the bottom face 64 of the turret 42. Thus the compression springs 76 which press the manifold plate 66 against the turret face 64, also press the scraper blades 84, 85 against the turret face 64. A trough 86 disposed under the scraper blades is provided to catch the residual matter cleaned from the sleeve and plunger faces.

Figure 10:
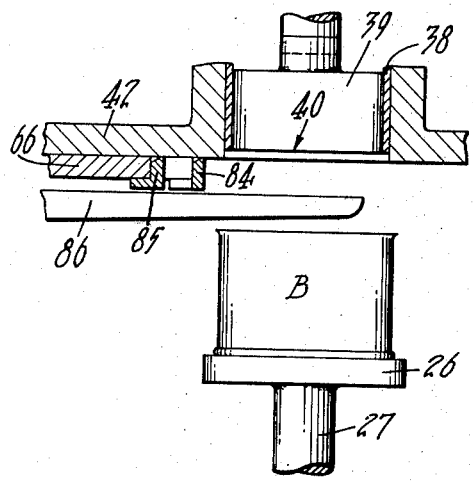
Figure 11:
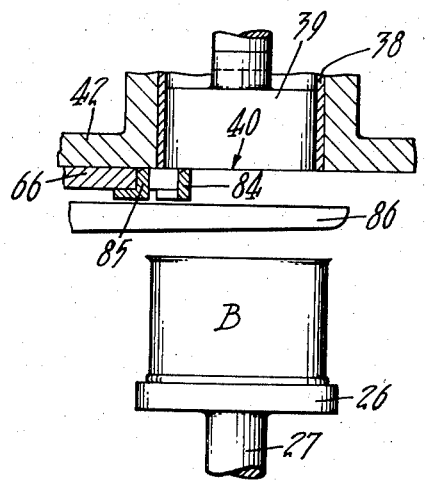

In order to insure proper cleaning of the sleeve and plunger faces without risking collision of the side of the sleeve against the scraper blades, provision is made to lift the sleeve 38 and its plunger 39 up into the turret 42 to a level above the scraping edge of the scraper blades 84, 85, as they approach the blades as shown in Fig. 10, and then move them down on top of the first or primary blade 84 when the sleeve and plunger, constituting a carrier element 37 are in vertical or opposed alignment as shown in Fig. 11. Lifting of the carrier unit is effected by raised projections 88, 89 formed in the cam grooves 53, 61 respectively of the stationary cam 54.

The cam projections 88, 89 are located on the approach side of the primary scraper 84 and in such spaced relation thereto that the cam rollers 52, 59 on the respective sleeve slides 45 and plunger slides 56 engage the projections and start to ride up on them just before the leading edge of the sleeve 38 advances into position adjacent the primary scraper blade 84. The peak or high point of the projections 88, 89 carries the leading edge of the sleeve 38, and the leading edge of the plunger 39 over the scraper blade 84 and thus as the cam rollers 52, 59 ride down the opposite side of the projections the bottom or end faces of the sleeve 38 and its plunger 39 are brought down on top of the primary blade 84 at a point beyond or in back of the leading edges of the sleeve and the plunger. Thus the sleeve 38 and the plunger 39 are prevented from colliding with and causing damage to the scraper blades.

As the discharge ends or bottom faces of the sleeve 38 and the plunger 39 advance across the primary scraper 84, any residual matter clinging to the faces is scraped off into the trough 86. The cleaning of the faces by the primary scraper 84 takes place only from the point or line of initial contact of the scraper with the faces. The portion of the faces preceding the line of initial contact above mentioned is cleaned by the second or auxiliary scraper blade 85. It is for this purpose that the auxiliary blade 85 is located behind the primary blade 84 in spaced relation thereto. With this relation of the blades 84, 85 the primary blade 84 is first engaged by the faces to locate them and then as the carrier element advances while the primary blade holds the element faces at a predetermined level, the auxiliary blade 85 located behind the primary blade 84, rides along the faces and scrapes those portions missed or unscraped by the primary blade. In this manner the two blades 84, 85 cooperate in cleaning the entire area of the end faces of the carrier elements 37.

In order to insure proper contact of the scraper blades 84, 85 with the faces of the carrier elements 37, the sleeves 38 and plungers 39 are released from the positive control of their cam grooves 53, 61 after their faces to be cleaned are engaged against or aligned with the primary scraper 84, and are subjected to a pressure which yieldably presses the carrier element faces against the scraper blades. For this purpose the stationary cam 54 in its periphery, adjacent and just beyond the projections 88, 89 in the respective grooves 53, 61, is provided with a pair of vertically movable slides or cam inserts 91, 92 (Figs. 3, 4, 5 and 6) which extend across the cam grooves 53, 61 respectively and which have short straight continuing cam grooves 93, 94 for the reception of the cam rollers 52, 59.

The cam inserts 91, 92 are retained in vertical slideways 95, 96 formed in the cam 54 and are held under a downwardly exerted spring pressure effected by compression springs 97, 98 housed in bores in the upper ends of the inserts and interposed between the inserts and a portion of the cam 54 at the upper ends of the slideways. Side lugs 99 (Fig. 4) extending from the inserts 91, 92 and engageable against adjacent stop ledges 101 on the cam prevent displacement of the inserts from their slideways.

In operation, the cam rollers 52, 59 of the sleeve slides 45 and the plunger slides 56 ride into the inserts 91, 92 immediately upon leaving the lifter projections 88, 89 in the cam grooves 53, 61 and hence control of the sleeve slides 45 and plunger slides 56 is transferred to the inserts. The compression springs 97, 98 backing up the inserts press the sleeve slides 45 and plunger slides 56 downwardly and thus yieldably holds the end or bottom faces of the sleeves 38 and the plungers 39 against the scraper blades 84, 85 during the cleaning operation.

The cam inserts 91, 92 are of a length sufficient to retain this yieldable pressure on the sleeves 38 and plungers 39 until they ride off the scraper blades 84, 85. The cam rollers 52, 59 thereupon re-enter the stationary cam grooves 53, 61 and continue control over the movements of the sleeves 38 and plungers 39.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for filling meat products and the like into containers, the combination of a carrier element for receiving and carrying a charge of a said product, said element comprising a sleeve and a plunger mounted for reciprocation in said sleeve, said sleeve terminating in an annular product-contacting end face and said plunger having a flat product-contacting face substantially parallel to said face of the sleeve, means for advancing said carrier element laterally along a predetermined path to meet and align with a said container, means for actuating said plunger to deliver said charge and fill said aligned container, a scraper member disposed adjacent the paths of travel of said product contacting faces of the plunger and sleeve for engagement therewith to clean them of residual product after said container filling operation, means operable in time with the advancement of said carrier element and after said filling operation for lifting said sleeve and said plunger each independently of the other to carry the leading edges of said sleeve and plunger faces over said scraper member and then immediately lower said faces into initial scraping engagement therewith, and means for yieldably pressing said advancing sleeve and plunger faces independently against said scraper member to thoroughly clean said faces.

2. The combination set forth in claim 1 wherein said scraper member comprises a primary scraper edge and an auxiliary scraper edge coplanar therewith and spaced beyond said primary edge, whereby said primary edge makes said initial scraping engagement with said sleeve and plunger faces after the leading edges of said faces have passed beyond said primary scraper edge, and said auxiliary scraper edge cleans the unscraped portions of said faces ahead of the line of said initial engagement with said primary scraper edge.

3. In a machine for filling meat products and the like into containers, the combination of a carrier element for receiving and carrying a charge of the product to be filled into a container, said carrier element having a discharge end provided with a face and a discharge opening in said face, means for advancing said carrier element laterally along a path of travel to meet and align with said container, means for delivering said charge through said opening to fill said container, a scraper member disposed adjacent the path of travel of said face for engagement therewith to clean residual product from said face after said container filling operation, means operable in time with the advancement of said carrier element after said container filling operation and after the leading edge of said face has passed beyond alignment with said scraper for moving said carrier element face and said scraper towards each other and into scraping engagement thereby insuring initial engagement of said scraper against said face at a point beyond the leading edge of the face and preventing interference by the scraper with the lateral advancement of said carrier element, and means for yieldably pressing said scraper member and said face together to insure removal of said residual product from said face.

4. The combination set forth in claim 3 wherein said scraper member comprises a primary scraper edge and an auxiliary scraper edge coplanar therewith and spaced beyond said primary edge, whereby said primary scraper edge makes said initial scraping engagement with said carrier element face after the leading edge of the face has passed beyond said primary scraper edge, and said auxiliary scraper edge cleans the unscraped portions of said face ahead of the line of said initial engagement with said primary scraper edge.

5. In a machine for filling meat products and the like into containers, the combination of a rotatable turret having a smooth face, a tubular carrier element for receiving and carrying a charge of a said product, said element being mounted for reciprocation in said turret and having at an end thereof a face substantially parallel to said turret face and alignable therewith, said carrier face having an opening therein through which said charge of the product is deliverable into a container, means for rotating said turret to advance said carrier element, means for delivering said charge from said carrier to fill said container, a scraper disposed adjacent the path of said turret and carrier faces and beyond said container filling operation, a yieldable mounting for said scraper to yieldably press said scraper against said smooth face of the turret, and means for withdrawing said carrier face into said turret beyond said turret face after said container filling operation and to subsequently reverse the travel of said carrier element to effect initial engagement of said carrier face with said scraper immediately after the leading edge of said carrier face has advanced beyond the scraper and to press said face against said scraper to clean said carrier face of residual product without interfering with the advancement of said turret.

6. In a machine for filling meat products and the like into containers, the combination of a rotatable turret having a smooth face, a carrier sleeve for carrying a charge of a said product and mounted for reciprocation in said turret, a plunger mounted for reciprocation in said carrier sleeve, said plunger and said carrier sleeve having product-contacting faces substantially parallel to each other and to said turret face and all of said faces being substantially alignable in a common plane, said carrier face having an opening therein through which said charge is deliverable into a container, means for rotating said turret to advance said sleeve and plunger, means operable in time with the rotation of said turret for reciprocating said plunger to deliver said charge from said carrier sleeve and to fill said container therewith, a scraper member disposed adjacent the path of said faces and while said faces are substantially aligned in said common plane after said contanier filling operation, said scraper member comprising spaced primary and auxiliary scraper blades having coplanar scraping edges, a yieldable mounting for said scraper member to yieldably press said scraper blades against said smooth face of the turret, and means for withdrawing said carrier sleeve and plunger faces into said turret beyond said turret face after said container filling operation and subsequently to reverse the travel of said carrier sleeve and plunger faces to effect initial engagement of said sleeve and plunger faces with said primary scraper blade immediately after the leading edges of said sleeve and plunger faces have passed beyond said primary scraper blade and to press said faces against said scraper member to clean them of residual product without interfering with the advancement of said turret, said auxiliary scraper blade being spaced beyond said primary scraper blade to clean the unscraped portions of said carrier sleeve and plunger faces ahead of the line of their said initial engagement with said primary scraper.

References Cited in the file of this patent

UNITED STATES PATENTS 2,433,061     Pearson et al.  ---------- Dec. 23, 1947